(12) United States Patent
Hsiao

(10) Patent No.: US 8,478,130 B2
(45) Date of Patent: Jul. 2, 2013

(54) OPTICAL COMMUNICATION DEVICE

(75) Inventor: Yu-Chao Hsiao, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 175 days.

(21) Appl. No.: 13/217,284

(22) Filed: Aug. 25, 2011

(65) Prior Publication Data

US 2013/0011134 A1  Jan. 10, 2013

(30) Foreign Application Priority Data

Jul. 5, 2011  (TW) .............................. 100123594

(51) Int. Cl.
*H04B 10/00* (2006.01)

(52) U.S. Cl.
USPC .............................. 398/140; 398/135; 398/139

(58) Field of Classification Search
USPC ........................................................ 398/140
See application file for complete search history.

(56) References Cited

U.S. PATENT DOCUMENTS

| | | | | |
|---|---|---|---|---|
| 640,336 | A * | 1/1900 | Tokheim | 222/205 |
| 5,339,183 | A * | 8/1994 | Suzuki | 398/75 |
| 6,388,782 | B1 * | 5/2002 | Stephens et al. | 398/79 |
| 6,606,178 | B1 * | 8/2003 | Rhee et al. | 398/188 |
| 6,618,176 | B2 * | 9/2003 | Alexander et al. | 398/91 |
| 6,690,886 | B1 * | 2/2004 | Guy | 398/81 |
| 7,058,311 | B1 * | 6/2006 | Islam et al. | 398/140 |
| 7,248,802 | B2 * | 7/2007 | Grohn | 398/155 |
| 7,254,341 | B2 * | 8/2007 | Islam et al. | 398/140 |
| 7,672,546 | B2 * | 3/2010 | Welch et al. | 385/14 |
| 8,103,168 | B1 * | 1/2012 | Enoch et al. | 398/140 |
| 8,340,515 | B2 * | 12/2012 | Umnov et al. | 398/1 |
| 2001/0046344 | A1 * | 11/2001 | Hayashi et al. | 385/15 |
| 2003/0048503 | A1 * | 3/2003 | Aso et al. | 359/124 |
| 2005/0213985 | A1 * | 9/2005 | Stephens et al. | 398/140 |
| 2008/0044128 | A1 * | 2/2008 | Kish et al. | 385/14 |
| 2008/0145063 | A1 * | 6/2008 | Li et al. | 398/140 |
| 2009/0232497 | A1 * | 9/2009 | Archambault et al. | 398/50 |
| 2009/0238568 | A1 * | 9/2009 | Lyubomirsky | 398/79 |
| 2010/0021105 | A1 * | 1/2010 | Watanabe | 385/11 |
| 2010/0142958 | A1 * | 6/2010 | Matsumoto | 398/79 |
| 2010/0247107 | A1 * | 9/2010 | Sadot et al. | 398/140 |
| 2011/0052196 | A1 * | 3/2011 | Gnauck et al. | 398/79 |
| 2011/0243576 | A1 * | 10/2011 | Oomori | 398/208 |
| 2011/0249936 | A1 * | 10/2011 | Welch et al. | 385/31 |
| 2011/0280581 | A1 * | 11/2011 | Chann et al. | 398/98 |
| 2012/0224855 | A1 * | 9/2012 | Liu et al. | 398/79 |

OTHER PUBLICATIONS

Geraghty et al; wavelength conversion for WDM communication systems using four-wave mixing in semiconductor optical amplifiers; Oct. 1997; IEEE journal of selected topics in quantum electronics, vol. 3 No. 5; pp. 1146-1155.*

\* cited by examiner

*Primary Examiner* — Kenneth N Vanderpuye
*Assistant Examiner* — Amritbir Sandhu
(74) *Attorney, Agent, or Firm* — Altis Law Group, Inc.

(57) ABSTRACT

An optical communication device includes a transmitter module and a receiver module. The transmitter module includes a two laser sources, two optical modulators optically coupled to the two light sources, respectively, and an optical coupler, a semiconductor optical amplifier, an optical coupler, four optical band-pass filters or a demultiplexer, and an optical multiplexer optically coupled in series. The laser beams emitted from the two laser sources are converted into four laser beams having different frequencies due to a four-wave mixing effect occurring in the semiconductor optical amplifier. The receiver module includes a demultiplexer and four photoelectric conversion elements to receive the four laser beams respectively and convert them to electrical signals.

10 Claims, 1 Drawing Sheet

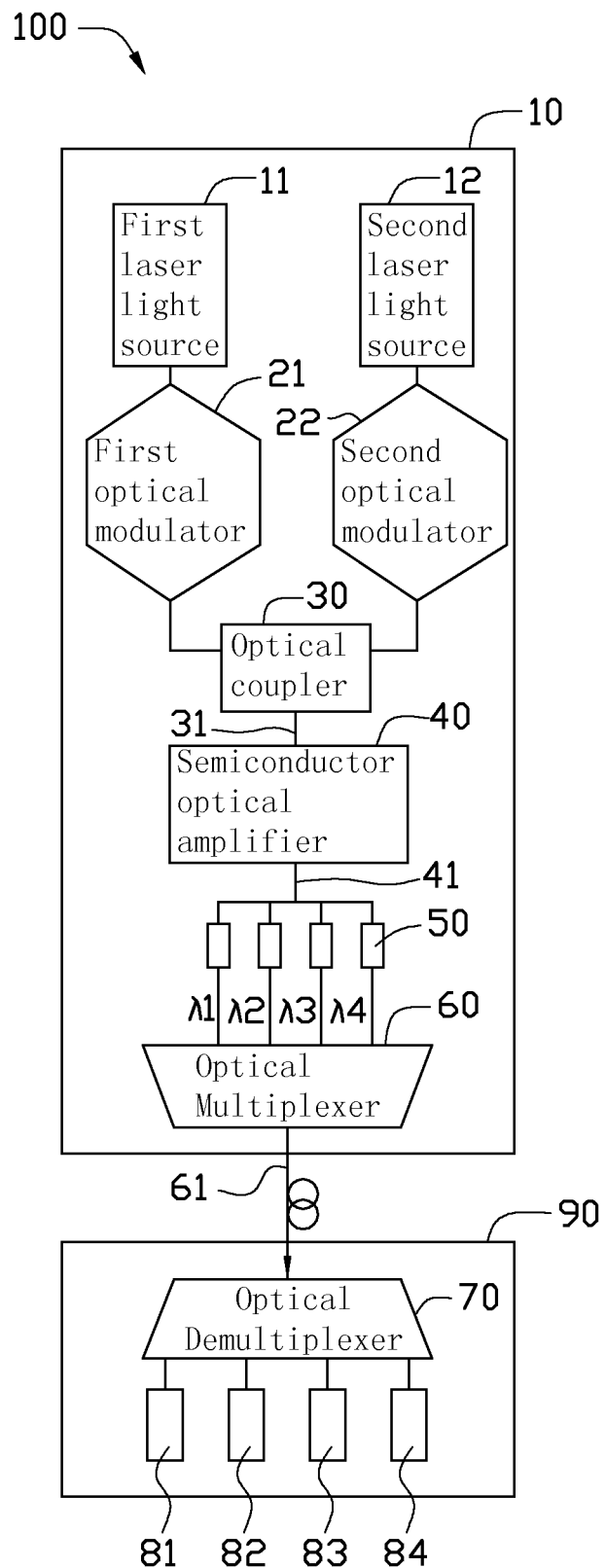

OPTICAL COMMUNICATION DEVICE

BACKGROUND

1. Technical Field

The present disclosure relates to optical communication devices.

2. Description of Related Art

Optical communication devices usually have a transmission module and a receiver module. The transmission modules have the same number of light sources as photoelectric conversion elements in the receiver modules, which makes for bulky optical communication devices.

What is needed, therefore, is an optical communication device that will overcome the above mentioned shortcomings.

BRIEF DESCRIPTION OF THE DRAWINGS

Many aspects of the present optical communication device can be better understood with reference to the following drawings. The components in the drawings are not necessarily drawn to scale, the emphasis instead being placed upon clearly illustrating the principles of the present optical communication device and method. Moreover, in the drawings, like reference numerals designate corresponding parts throughout the views.

The FIGURE is a generalized schematic diagram of an exemplary optical communication device of the disclosure.

DETAILED DESCRIPTION

Referring to the FIGURE, an optical communications device 100 includes a transmitter module 10 and a receiver module 90.

The transmitter module 10 includes a first laser (light) source 11 and a second laser (light) source 12. That is, the transmitter module 10 can communicate on two wavelengths. The first laser source 11 emits a first laser beam with a $\lambda 1$ central wavelength and a corresponding frequency of f1. The laser source 12 emits a second laser beam with a $\lambda 2$ central wavelength and a corresponding frequency of f2, and $\lambda 2 \neq \lambda 1$. In this embodiment, the first and second laser sources 11 and 12 are laser diodes (LD).

The transmitter module 10 also includes a first optical modulator 21, a second optical modulator 22, an optical coupler 30, a semiconductor optical amplifier 40 (SOA), four optical band-pass filters 50 (OBPF), and an optical multiplexer 60.

The first optical modulator 21 is optically coupled to the first laser source 11, and the second optical modulator 22 is optically coupled to the second laser source 12. In this embodiment, the first optical modulator 21 and the second optical modulator 22 are optically coupled to the respective first laser source 11 and second laser source 12 by optical fibers. The first optical modulator 21 and the second optical modulator 22 each are configured for loading an electrical signal to be transmitted on the corresponding first and second laser beam by modulating amplitudes, frequencies, phases or polarizations of the respective first and second laser beams. The first and second optical modulators 21, 22 are Mach-Zehnder Modulators (MZM) or electro-absorption modulators (EAM).

The first and second optical modulators 21, 22 may enhance the bandwidth of corresponding laser beam, reduce the chirp effect, increase the bandwidth distance, and adjust the optical gain, which will be beneficial for producing four-wave mixing effect after the modulated laser beams entering the semiconductor optical amplifier 40.

The optical coupler 30 here is an optical combiner, which combines the modulated first and second laser beams into a single optical fiber 31, and then into the semiconductor optical amplifier (SOA) 40.

The first laser beam and the second laser beam become four light beams due to a four-wave mixing (FWM) effect occurring in the active region (not shown) of the SOA 40. Although FWM is normally thought to be disadvantageous in transmission, in this disclosure, FWM helps the two original signal channels of frequencies f1 and f2 convert into four final signal channels of frequencies f1, 2f1-f2, f2, and 2f2-f1.

The SOA 40 has a single output port 41, an optical splitter (not shown) may be used to evenly split the output laser beam into four laser beams and guided them to the four optical band-pass filters 50, respectively. In other embodiments, the SOA 40 may have four output ports connected to the four optical band-pass filters 50 directly. The four optical band-pass filters 50 are connected in parallel. The four optical band-pass filters 50 are used to filter noise from around the available wavelengths. The noise may be caused by laser beams other than the laser beams with the frequency f1, 2f1-f2, 2f2-f1, and f2. Each optical band-pass filter 50 filters the noise and leaves a laser beam of determined wavelength. For example, one optical band-pass filter 50 outputs a laser beam with frequency of f1 another optical band-pass filter 50 outputs a laser beam with frequency of 2f1-f2, and so on.

In other embodiments, a demultiplexer may be used to replace the four optical band-pass filters 50. Both the four optical band-pass filters 50 or the demultiplexer may separate the output laser beams of the SOA 40 into four laser beams each having determined frequency, that is, the first laser beam with $\lambda 1$ wavelength, the second laser beam with $\lambda 2$ wavelength, a third laser beam with 2f1-f2 frequency having a $\lambda 3$ wavelength, and a fourth laser beam with 2f2-f1 frequency having a $\lambda 4$ wavelength.

The four laser beams enter the optical multiplexer 60 to propagate in a single optical fiber 61 and are transmitted to the receiver module 90.

The receiver module 90 includes an optical demultiplexer 70 and four photoelectric conversion elements 81, 82, 83, and 84. The optical demultiplexer 70 splits the four laser beams in the optical fiber 61 into four channels, and the four photoelectric conversion elements 81, 82, 83, and 84 are located at an end of each channel to receive and convert a corresponding determined laser beam into a corresponding electrical signal.

The four photoelectric conversion elements 81, 82, 83, and 84 may be PIN photodiodes or avalanche photodiodes (APD), and so on.

The optical communication device 100 makes use of four-wave mixing effect to produce four laser beams while there are only two laser sources in the transmission module 10, thus the number of light sources is decreased as well as the size of the transmission module 10. The optical communication device 100 is beneficial for high-capacity transmission.

The transmission module 10 and the receiver module 90 may be assembled unitarily in one electronic device or separately configured in two different electronic devices, for example, a computer and a data cable.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. An optical communication device comprising:
a transmission module comprising:
   a first laser source for emitting a first laser beam having a first central wavelength;
   a second laser source for emitting a second laser beam with a second central wavelength different from the first central wavelength;
   a first optical modulator optically coupled to the first laser source and configured to modulate the first laser beam;
   a second optical modulator optically coupled to the second laser source and configured to modulate the second laser beam;
   a first optical fiber;
   an optical coupler optically coupled to the first and second optical modulator, the optical coupler configured for combining and directing the modulated first and second laser beams into the first optical fiber;
   a semiconductor optical amplifier optically coupled to the first optical fiber, the semiconductor optical amplifier configured for producing a third laser beam having a third wavelength, and a fourth laser beam having a fourth wavelength based upon four-wave mixing effect;
   a second optical fiber;
   four band-pass filters optically coupled to the semiconductor optical amplifier to separate the modulated first and second laser beams, and the third and fourth laser beams into four channels; and
   an optical multiplexer optically coupled to the four band-pass filters to combine and direct the four laser beams into the second optical fiber; and
a receiving module comprising:
   an optical demultiplexer configured to receive and split the four laser beams in the second optical fiber into four channels; and
   four photoelectric conversion elements coupled to the optical demultiplexer, and configured to receive and convert the four laser beams into electrical signals, respectively.

2. The optical communication device of claim 1, wherein the first optical modulator is Mach-Zehnder modulator or an electro-absorption modulator.

3. The optical communication device of claim 1, wherein the second optical modulator is Mach-Zehnder modulator or an electro-absorption modulator.

4. The optical communication device of claim 1, wherein the four photoelectric conversion elements are PIN photodiodes or avalanche photodiodes.

5. The optical communication device of claim 1, wherein the first laser beam has a frequency of f1, the second laser beam has a frequency of f2, the third laser beam has a frequency of 2f1-f2, and the fourth laser beam has a frequency of 2f2-f1.

6. An optical communication device comprising:
a transmission module comprising:
   a first laser source for emitting a first laser beam having a first central wavelength;
   a second laser source for emitting a second laser beam with a second central wavelength different from the first central wavelength;
   a first optical modulator optically coupled to the first laser source and configured to modulate the first laser beam;
   a second optical modulator optically coupled to the second laser source and configured to modulate the second laser beam;
   a first optical fiber;
   an optical coupler optically coupled to the first and second optical modulator, the optical coupler configured for combining and directing the modulated first and second laser beams into the first optical fiber;
   a semiconductor optical amplifier optically coupled to the first optical fiber, the semiconductor optical amplifier configured for producing a third laser beam having a third wavelength, and a fourth laser beam having a fourth wavelength based upon four wave mixing effect;
   a second optical fiber;
   a first demultiplexer optically coupled to the semiconductor optical amplifier to separate the modulated first and second laser beams, and the third and fourth laser beams into four channels; and
   an optical multiplexer optically coupled to the first demultiplexer to combine and direct the four laser beams into the second optical fiber; and
a receiving module comprising:
   a second optical demultiplexer configured to receive and split the four laser beams in the second optical fiber into four channels; and
   four photoelectric conversion elements coupled to the second optical demultiplexer, and configured to receive and convert the four laser beams into electrical signals, respectively.

7. The optical communication device of claim 6, wherein the first optical modulator is Mach-Zehnder modulator or an electro-absorption modulator.

8. The optical communication device of claim 6, wherein the second optical modulator is Mach-Zehnder modulator or an electro-absorption modulator.

9. The optical communication device of claim 6, wherein the four photoelectric conversion elements are PIN photodiodes or avalanche photodiodes.

10. The optical communication device of claim 6, wherein the first laser beam has a frequency of f1, the second laser beam has a frequency of f2, the third laser beam has a frequency of 2f1-f2, and the fourth laser beam has a frequency of 2f2-f1.

* * * * *